(12) United States Patent
Cassar et al.

(10) Patent No.: US 11,952,058 B2
(45) Date of Patent: Apr. 9, 2024

(54) METHOD FOR CONTROLLING A STEERING SYSTEM WITH TWO REDUNDANT POWER UNITS

(71) Applicant: JTEKT EUROPE, Irigny (FR)

(72) Inventors: Stéphane Cassar, Munich (DE); Bruno Collerais, Munich (DE); Giovanni Dallara, Munich (DE)

(73) Assignee: JTEKT EUROPE, Irigny (FR)

( * ) Notice: Subject to any disclaimer, the term of this patent is extended or adjusted under 35 U.S.C. 154(b) by 586 days.

(21) Appl. No.: 17/255,094

(22) PCT Filed: Jul. 9, 2019

(86) PCT No.: PCT/FR2019/051700
§ 371 (c)(1),
(2) Date: Dec. 22, 2020

(87) PCT Pub. No.: WO2020/012108
PCT Pub. Date: Jan. 16, 2020

(65) Prior Publication Data
US 2021/0261189 A1 Aug. 26, 2021

(30) Foreign Application Priority Data
Jul. 10, 2018 (FR) ...................... 18/56327

(51) Int. Cl.
*B62D 5/00* (2006.01)
*B62D 5/04* (2006.01)
(52) U.S. Cl.
CPC .................. *B62D 5/0463* (2013.01)
(58) Field of Classification Search
USPC .................................... 701/36–44
See application file for complete search history.

(56) References Cited

U.S. PATENT DOCUMENTS 5,228,405 A * 7/1993 Merten .................. B63H 25/30
440/61 R
5,257,828 A * 11/1993 Miller .................... H02K 29/12
701/41
(Continued)

FOREIGN PATENT DOCUMENTS

DE 10 2015 116937 A1 4/2017

OTHER PUBLICATIONS

Dec. 19, 2019 International Search Report issued in International Patent Application No. PCT/FR2019/051700.
(Continued)

*Primary Examiner* — Jonathan L Sample
(74) *Attorney, Agent, or Firm* — Oliff PLC

(57) ABSTRACT

A method for controlling a steering system of a motor vehicle, including first and second channels in parallel, each including an electric power unit delivering an assist force to the steering system of the vehicle, in order to obtain the sum of two delivered assist forces, corresponding to the total assist force required, the method including: evaluating the channel having the lowest power unit power supply voltage value; defining a master channel function delivering an initial portion of the total assist force requirement and a slave channel function delivering a variable complementary portion of the assist force, corresponding to the difference between the initial portion of force actually delivered and the total force requirement; and pairing the master channel function with the channel having the lowest power unit power supply voltage value, and the slave channel function with the channel having the highest power unit power supply voltage value.

5 Claims, 1 Drawing Sheet

(56) References Cited

U.S. PATENT DOCUMENTS

Figure 1:
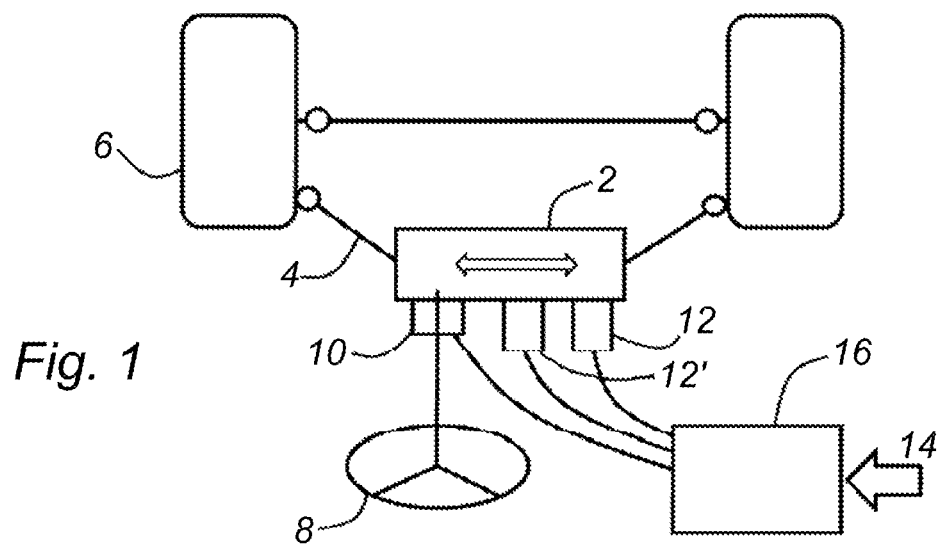

| | | | | |
|---|---|---|---|---|
| 6,863,150 B1* | 3/2005 | Tanaka | B62D 5/0463 | 180/443 |
| 7,739,005 B1* | 6/2010 | Tang | B60L 3/10 | 701/69 |
| 7,837,004 B2* | 11/2010 | Yasuda | B62D 5/008 | 180/407 |
| 8,698,435 B2* | 4/2014 | Tada | B62D 5/0484 | 318/400.26 |
| 9,346,486 B2* | 5/2016 | Itamoto | B62D 6/00 | |
| 9,751,556 B1* | 9/2017 | Lin | B62D 5/0481 | |
| 2004/0007416 A1* | 1/2004 | Furumi | B62D 5/046 | 180/443 |
| 2005/0257992 A1 | 11/2005 | Shiino et al. | | |
| 2006/0087269 A1* | 4/2006 | Iwazawa | B62D 5/046 | 318/432 |
| 2007/0251754 A1* | 11/2007 | Webert | B62D 5/065 | 701/41 |
| 2008/0211441 A1* | 9/2008 | Nagase | B62D 5/0457 | 318/440 |
| 2009/0065288 A1* | 3/2009 | Matsuda | B62D 5/0463 | 180/446 |
| 2009/0078493 A1* | 3/2009 | Nagase | B62D 5/046 | 180/443 |
| 2010/0224436 A1* | 9/2010 | Shiina | B62D 5/0409 | 180/444 |
| 2013/0151081 A1* | 6/2013 | Delarche | B62D 5/0493 | 701/42 |
| 2014/0184107 A1* | 7/2014 | Maekawa | H02M 7/48 | 307/115 |
| 2015/0012180 A1* | 1/2015 | Hayashi | B62D 6/003 | 701/41 |
| 2015/0035464 A1* | 2/2015 | Maekawa | H02M 7/5387 | 318/400.21 |
| 2016/0229446 A1* | 8/2016 | Tamaizumi | B62D 6/002 | |
| 2017/0106904 A1* | 4/2017 | Hanson | B62D 6/10 | |
| 2018/0022379 A1* | 1/2018 | Sasaki | B62D 5/0481 | 701/41 |
| 2018/0111643 A1* | 4/2018 | Kim | B60W 20/00 | |
| 2018/0281846 A1 | 10/2018 | Schreiner | | |
| 2018/0304917 A1* | 10/2018 | Michelis | B60W 10/16 | |
| 2020/0062301 A1* | 2/2020 | Farrelly | B62D 5/0409 | |
| 2021/0086824 A1* | 3/2021 | Cassar | B62D 5/0487 | |

OTHER PUBLICATIONS

Dec. 19, 2019 Written Opinion issued in International Patent Application No. PCT/FR2019/051700.

* cited by examiner

METHOD FOR CONTROLLING A STEERING SYSTEM WITH TWO REDUNDANT POWER UNITS

The present invention concerns a method for controlling a motor vehicle steering system, as well as a steering system including means implementing such a controlling method.

The motor vehicles generally have a steering system comprising a motorization delivering an assist force on the steering of the vehicle, corresponding to a total requested assist force requirement, which depends on a torque applied by the driver measured by a drivers intention sensor, in order to provide a portion of the effort required for pivoting the wheels. The steering wheel torque will be referred to hereinafter as the torque applied by the driver on a steering wheel.

The motorization used in the steering systems is generally an electric motorization of the «brushless» type. These motorizations have in particular a fast dynamic response, a significant efficiency, a slow wear, and a low noise level. Furthermore, it is known that these motorizations are characterized, at a given power supply voltage and temperature, by a no-load speed and a blocked rotor operating torque, defining the possible operating points of the motorization therebetween. A drop in the power supply voltage leads to reducing the no-load speed, and therefore a change in the operating points of the motorization.

The «brushless» type electric motorization has a first operating mode: the «motor» mode, that is to say that the motorization provides a driving force on a rack-type steering member, when the rotational speed of the motorization is lower than the no-load speed, for a given power supply voltage and temperature.

The «brushless» type electric motorization has a second operating mode: the «generator» mode, that is to say that the motorization exerts a brake torque and therefore a braking force on the rack-type steering member, when the rotational speed of the motorization is greater than the no-load speed, for a given power supply voltage and temperature.

Moreover, car manufacturers are now developing autonomous driving functions, allowing more or less automating some running modes, such as functions of automatic parking of the vehicle, of running in traffic jams, of following a previous vehicle, or even of fully autonomous driving. These different functions use the steering system to carry out the pivoting of the wheels, the driver exerting no more effort in this direction.

The operational safety of the steering system is therefore significant, both for the manual driving assistance and for the autonomous driving functions.

In order to meet the safety and availability requirements of the steering system, it is customary to implement two motorizations disposed in parallel, each comprising an electric motorization with its own power supply which can each apply a portion of the total assist force requirement on the steering. In particular, a complete redundancy of the motorization system is carried out, comprising two equivalent independent channels disposed in parallel, each including a motorization with its power supply, and different functions such as the reception of signals from the vehicle, the controlling of the system and the controlling of the motorization control. Thus, the motorizations can operate independently, and/or simultaneously.

When the motorizations operate simultaneously, the two assist channels, in a normal operating mode, each ensure the delivery of an identical assist force, the two channels being connected to the same actuation axis, that is to say an axis of rotation of the motorizations. That is to say, each channel delivers a part of the total requested assist force requirement. In the normal operating mode, the redundancy of the motorization system is ensured.

However, in a vehicle equipped with two independent power supply networks, the respective operating conditions thereof may be variables and affect the power supply of the two channels which then have different capacities, with regard to the delivery of the assist power. This difference can lead to operating disturbances of one channel relative to the other. More specifically, the no-load speed of the channel whose lowest power supply voltage decreases.

Thus, the rotational speed imposed on the motorization of the channel, whose power supply voltage is the lowest, by the motorization of the channel, whose power supply voltage is the highest, can be greater than the no-load speed of said motorization then causing the creation of a brake torque by said motorization. Said motorization then operates in a generator mode.

The brake torque, increasing with the rotational speed of the steering wheel, creates an undesirable, even disturbing, feeling at the steering wheel and decreases the overall efficiency of the motorizations. The two channels are then in a degraded operating mode.

In this type of degraded operating mode, it is known to offload the motorization of the channel having the lowest power supply. The motorization of the channel having the highest power supply then provides alone, at most the assistance in response to the total requested assist force requirement. The drivers feeling then depends on the total power available on this channel alone. Considering the hypothesis of a maximum available power of 50% of the overall maximum requirement, on each of the channels, the situations in which the driver could have an undesirable feeling become very rare while running (the lack of power will be felt during parking maneuvers, even in some very dynamic maneuvers). However, this solution leads to a loss of the redundancy of the motorization system.

It is also known, in the degraded operating mode, to decrease the power supply voltage of the undisturbed channel, that is to say of the channel having the higher power supply voltage, so as to equalize the power supply of the two channels. This solution allows maintaining the redundancy of the motorization system but reduces the no-load speed of the motorizations and therefore the maximum assist power that can be exerted by the motorizations on the steering of the vehicle. The total requested assist force requirement may not be provided.

The present invention aims, in particular, at avoiding the drawbacks of these prior techniques.

For this purpose, it proposes a method for controlling a steering system of a motor vehicle, including a first channel and a second channel which are disposed in parallel and each comprising an electric motorization delivering an assist force on the steering of the vehicle, in order to obtain a sum of the two delivered assist forces corresponding to a total requested assist force requirement, characterized in that the method comprises:

- a step of evaluating the channel having the lowest value of the power supply voltage of the motorization;
- a step of defining a master channel function delivering an initial part of the total assist force requirement and a slave channel function delivering a variable complementary part of an assist force, corresponding to the difference between the initial part of an actually delivered force and the total force requirement;

and a step of pairing the master channel function with the channel having the lowest value of the power supply voltage of the motorization, and the slave channel function with the channel having the highest value of the power supply of the motorization.

The evaluation step allows determine which of the first channel or the second channel has the lowest value of the power supply voltage of the motorization. Thus, it is known which of the first channel or the second channel has the lowest no-load speed, that is to say which of the first channel or the second channel is likely to switch to the generator mode.

Furthermore, the master channel function can be carried out by the first channel, respectively by the second channel, and the slave channel function can be carried out by the second channel, respectively by the first channel.

The pairing step allows determining the channel carrying out the master channel function and the channel carrying out the slave channel function.

The first channel and the second channel, by operating simultaneously, allow a redundancy of the motorization system. More particularly the first channel, or respectively the second channel, carry out the master channel function delivering an initial part of the total assist force requirement and the second channel, or respectively the first channel, delivers based on an estimate or a measurement of the force which is actually delivered by the first channel, respectively the second channel, a variable complementary part of an assist force to reach the total force requirement. The motorizations of the first channel and the second channel operate at the same rotational speed although each provide a different or identical part of the total force requirement.

In this manner, in case of failure of the power supply of the motorization of the first or second channel, the channel having the failed power supply becomes the master channel. Thus, the channel having the failed power supply provides the initial part of the total force requirement. This initial part can be completely delivered when the imposed speed is lower than the no-load speed of the master channel, or can correspond to the initial part subtracted from a braking force when the imposed speed is greater than the no-load speed of the master channel. The complementary part delivered by the second channel completes the initial part so as to provide the totality of the total requested assist force requirement when the imposed speed is lower than the no-load speed of the master channel or the second channel completes the initial part so as to provide the totality of the total requested assist force requirement, by compensating for the braking force, when the imposed speed is greater than the no-load speed of the master channel.

Thus in the case of failure of the power supply to a channel, the redundancy is ensured and a large part of the total requested assist force requirement is provided.

The controlling method according to the invention may additionally include one or more of the following features, which can be combined with each other.

Advantageously, the initial part of the total force requirement corresponds to a portion of this total force requirement.

In particular, the initial part of the total force requirement may correspond to the totality of this total force requirement. In this manner, the calculation of the initial part is simplified.

According to one feature of the invention, the evaluation step is carried out by detecting a braking torque corresponding to the passage of one of the electric motorizations in the generator mode.

According to one feature of the invention, the evaluation step is carried out by comparing the value of the power supply voltage of each channel.

The comparison allows determining the voltage deviation between the two channels.

According to one feature of the invention, the evaluation step comprises a phase of determining a deviation threshold.

The deviation threshold allows determining an acceptable deviation between the two channels in order to limit the permutations of the master channel and slave channel function. The deviation threshold is a predefined fixed value or a variable value depending on the parameters of running the vehicle.

According to one feature of the invention, the value of the power supply voltage of the motorization of each channel is determined using signals of the force which is actually delivered by each of the channels.

According to one feature of the invention, each channel provides an assist force equal to a maximum of 50% of the total force requirement.

The object of the invention is also a steering system including means implementing a method for controlling this steering system according to the invention.

In particular, the steering system may include two electric motorizations each delivering an assist force on the steering of the vehicle.

Figure 2:
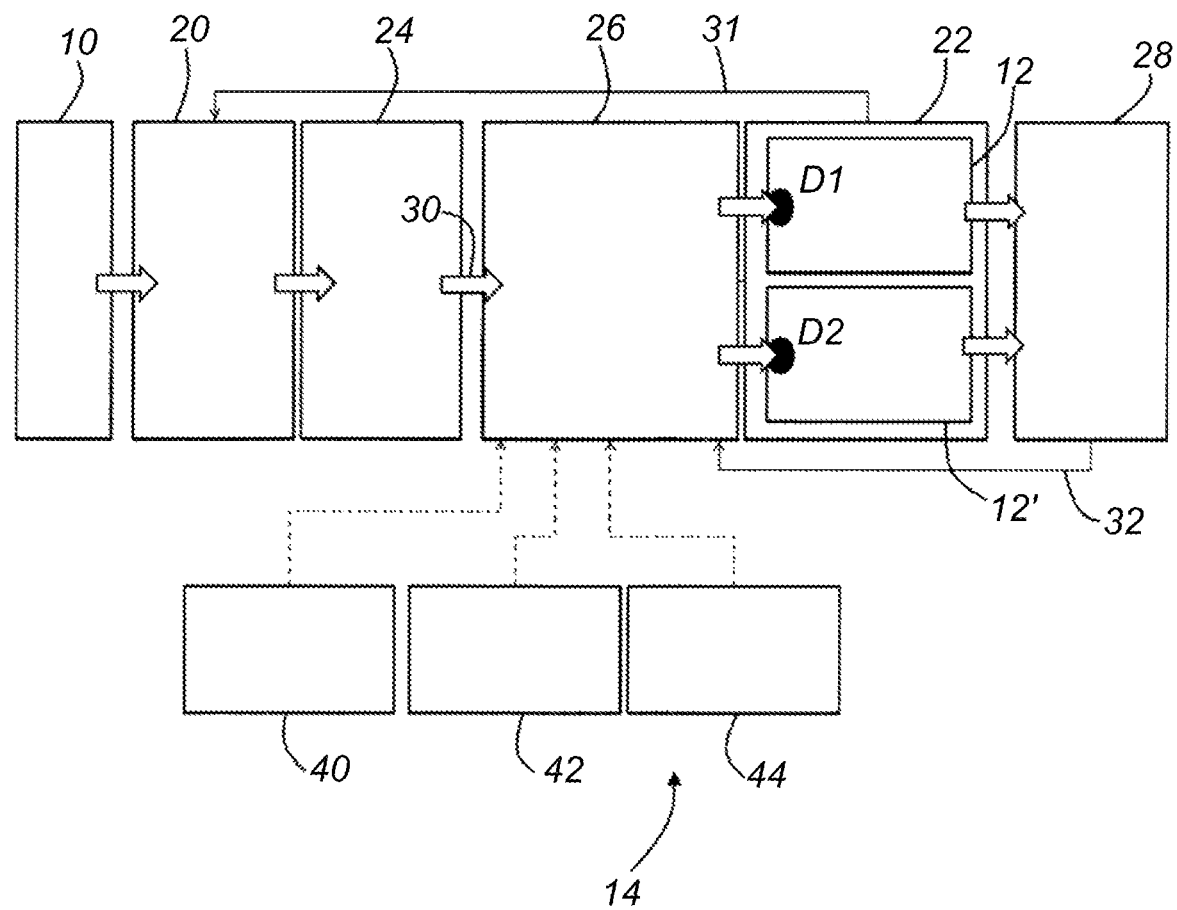

The invention will be better understood and other features and advantages will appear more clearly on reading the description given below by way of example, with reference to the appended drawings in which:

FIG. 1 is a diagram of a motor vehicle steering implementing a controlling method according to the invention; and FIG. 2 is a flowchart showing the operation of this controlling method.

FIG. 1 shows a steering box 2 including a rack-type controlling member which is disposed transversely in a vehicle, each end of which is connected by a tie rod 4 to a front wheel hub 6 in order to pivot it to ensure the steering of the vehicle.

A steering column equipped with a steering wheel 8 maneuvered by the driver, connected to the box 2, includes a sensor of an effort applied by the driver on this column, constituting a device for measuring the drivers intention 10.

Two electric motorizations 2, 12' forming a first channel 12 and a second channel 12' each including an electric power supply and controlling means, independently apply an assist force on the steering box 2, in order to add a total force to that delivered by the driver on the steering wheel 8 to provide an assistance in the cases of a manual driving, or to carry out an automatic steering in the case of an autonomous driving of the vehicle.

The electric motorizations 12, 12' each include an electric motor delivering a force, as presented below, or alternatively any other electromagnetic means applying a torque or a force on the steering box 2, in the form of a rotation or a translation. Subsequently, the action of the motorizations 12, 12' will be interchangeably referred to as torque or force.

A controlling computer 16 is connected to the drivers intention sensor 10, as well as to the motorizations 12, 12' and to the power supplies thereof, in order to evaluate the channel having the lowest value of the power supply voltage, to define a master channel and slave channel function, and to set individual torque setpoints D1, D2 for each of the motors 12, 12', in particular depending on different parameters received from the outside 14.

FIG. 2 shows the device for measuring the drivers intention 10, including the effort sensor applied by the driver on the steering column, sending information to a function of measuring the assist force 20 which is actually applied by each electric motor 12, 12'. The applied assist force can in particular be the torque which is actually delivered by each of the motorizations 12, 12' forming information received from a group of the motorizations 22 including these two motorizations.

The applied assistance force measurement function 20 receives a signal of the force 31 which is actually delivered by each of the channels of the motorization group 22, sends information to a total assist force requirement calculation function 24, which carries out this calculation based on all or part of the information delivered thereto.

The total assist force requirement calculation function 24 sends the total assist force requirement forming a first signal 30 to a function of controlling the redundant elements 26 constituted by the two motorizations 12, 12', determines the channel carrying out the master channel function and the channel carrying out the slave channel function, and calculates the assist force target intended for each of the motorizations contained in the group of the motorizations 22, by delivering to each an individual torque setpoint signal D1, D2.

The controlling system of each motorization 12, 12' receives the individual torque setpoint signal D1, D2 which is intended therefor, to control the electronic power supply of the electric motor thereof so that it delivers a motor torque corresponding to this setpoint.

Each motor 12, 12' then sends information to a function for estimating or measuring the capacity of the electric motors 28 to deliver the torque corresponding to the individual setpoint D1, D2 thereof. The estimation or measurement function 28 delivers in return this estimate or measurement forming a second signal 32 to the function of controlling the redundant elements 26.

In this manner, the function of controlling the redundant elements 26 has both the total assist force requirement 30 set by the assist force target calculation function 24, and takes into account the estimation or measurement of the second signal 32 representing the capacity of each motorization 12 to deliver the torque which is requested thereof, in order to adjust the individual torque setpoint signal D1, D2 which it will request from each of these motorizations 12, 12'.

In particular, the function of controlling the redundant elements 26 takes into account, in real time, the peculiarities of operation of each motorization 12, 12' according to the evolution of the state thereof to distribute the individual torque setpoint D1, D2 between the two motorizations 12, 12' in order to obtain a sum of delivered torque corresponding to the total assist force requirement 30.

The function of controlling the redundant elements 26 receives several external parameters 14 to calculate the individual torque setpoint D1, D2, comprising information from an function of estimating or measuring the situation of the electrical network of the vehicle 40, including in particular the voltage, the current and the electric power deliverable by the network.

In this manner, the function of controlling the redundant elements 26 knows in real time the possibility of electric power supply of each motorization 12, 12' which may be different for each of these motorizations in the case of an imbalance in the power supply networks, to establish the channel carrying out the master channel function and the channel carrying out the slave channel function, and to set the individual torque setpoint D1, D2 corresponding to a torque that the motorization could deliver.

A function of setting steering setpoints 42 from the vehicle or from an external source, to help maneuvering this steering, delivers a first parameter to the function of controlling the redundant elements 26.

A function of measuring the dynamic situation of the vehicle 44, for example measuring the speed of the vehicle, the lateral, longitudinal or vertical acceleration thereof, or the drift angle thereof, delivers a second parameter to the function of controlling the redundant elements 26.

The operation of the controlling method according to the invention is as follows.

The function of the redundant elements 26 determines, during an evaluation step, the channel having the lowest value of the power supply voltage of the motorization by detecting a braking torque corresponding to the passage of one of the electric motorizations in the generator mode, and/or by making a comparison of the value of the power supply voltage of each channel at a predetermined deviation threshold.

When the deviation of the value of the power supply voltage of each of the motorizations is less than the predetermined deviation threshold, one can in this case advantageously regularly invert the function exerted by the motorizations, for example, after each start of the vehicle, so as to use these two motorizations, in a similar manner, in order to equalize the operating wear thereof.

When the deviation of the value of the power supply voltage of each of the motorizations is greater than the predetermined deviation threshold, the function of the redundant elements 26 pairs the master channel function with the channel having the lowest value of the power supply voltage of the motorization, and the slave channel function with the channel having the highest value of the power supply of the motorization.

We will then take, and as an example, that the channel having the lowest value of the power supply voltage of the motorization is the first channel 12.

Thus, in our example, the master channel function is carried out by the first channel and the slave channel function is carried out by the second channel.

In the remainder of the description, the numerical references are noted with respect to the example.

The function of the redundant elements 26 then determines the individual torque setpoint D1 of the master channel 12, corresponding to an initial part of the total assist force requirement 30, and the individual torque setpoint D2 of the slave channel 12', corresponding to a complementary part of an assist force corresponding to the difference between the initial part of an actually delivered force and the total force requirement.

When a rotational speed imposed on the master channel 12 is lower than the no-load speed, the master channel 12 provides an initial part D1 corresponding to a predefined percentage of the total requirement. In particular, this initial part D1 may constitute a majority part of the total assist force requirement. The complementary part D2 of the slave channel 12' is set by taking into account the second signal 32 comprising the capacity of the master channel 12 to deliver the torque that is requested thereof. In this case, the redundancy of the motorization system is ensured and the total force requirement is provided.

When a rotational speed imposed on the master channel 12 is greater than the no-load speed thereof, the master channel 12 is in the generator mode. It provides an initial part D1 and a brake torque. The complementary part D2 of the slave channel 12' is set by taking into account the capacity of the master channel 12 to deliver the torque requested thereof and the created brake torque. In this case, the redundancy of the motorization system is ensured and the provided force is equal to the total force requirement subtracted from the brake torque.

The two motorizations 12, 12' operate complementarily to each other, and must therefore execute requests for unequal forces which are requiring no synchronization therebetween.

In general, the method can operate with only a motorization when the power supply voltage of the two channels is substantially equal, or with the two motorizations 12, 12' together operating complementarily to each other.

For an operation with a single motorization, the individual torque setpoint D1 of the master channel 12 is then equal to the total force requirement, the slave channel 12' remaining permanently controlled at a low or zero setpoint D2 to be ready to instantaneously deliver the variable complementary part of the assist force which will be automatically detected in the case of insufficient torque delivery by the master channel 12.

The complementary operation of the two motorizations can be used to deliver a significant power expected by the driver, in the case of fast maneuvers for example. Imperfections in the controlling of the motorizations giving for example small perceptible vibrations, in this driving case which is infrequent, will not affect the comfort of the vehicle.

The invention claimed is:

1. A method for controlling a steering system of a motor vehicle, including a first channel and a second channel which are disposed in parallel and each comprising an electric motorization delivering an assist force on the steering of the vehicle, in order to obtain a sum of the two delivered assist forces corresponding to a total requested assist force requirement, wherein the method comprises:
    a step of evaluating the channel having the lowest value of the power supply voltage of the motorization;
    a step of defining a master channel function delivering an initial part of the total assist force requirement and a slave channel function delivering a variable complementary part of an assist force, corresponding to the difference between an actually delivered force and the total force requirement;
    and a step of pairing the master channel function with the channel having the lowest value of the power supply voltage of the motorization, and the slave channel function with the channel having the highest value of the power supply of the motorization.

2. A controlling method according to claim 1, wherein the evaluation step is carried out by detecting a braking torque corresponding to the passage of any of the electric motorizations in generator mode.

3. A controlling method according to claim 1, wherein the value of the power supply voltage of the motorization of each channel is determined using signals of the force which is actually delivered by each of the channels.

4. The controlling method according to claim 1, wherein each channel provides an assist force equal to a maximum of 50% of the total force requirement.

5. A steering system comprising:
    a first channel and a second channel which are disposed in parallel and each comprising an electric motorization delivering an assist force on the steering of a vehicle, in order to obtain a sum of the two delivered assist forces corresponding to a total requested assist force requirement; and
    a processor that is configured to:
        evaluate the channel having the lowest value of the power supply voltage of the motorization;
        define a master channel function delivering an initial part of the total assist force requirement and a slave channel function delivering a variable complementary part of an assist force, corresponding to the difference between an actually delivered force and the total force requirement; and
        pair the master channel function with the channel having the lowest value of the power supply voltage of the motorization, and the slave channel function with the channel having the highest value of the power supply of the motorization.

* * * * *